Dec. 12, 1961  J. H. JACOBS  3,012,389
POWER MOWER
Filed March 4, 1959  3 Sheets-Sheet 1

INVENTOR.
JOSEPH H. JACOBS
BY
Braddock and Braddock
ATTORNEYS

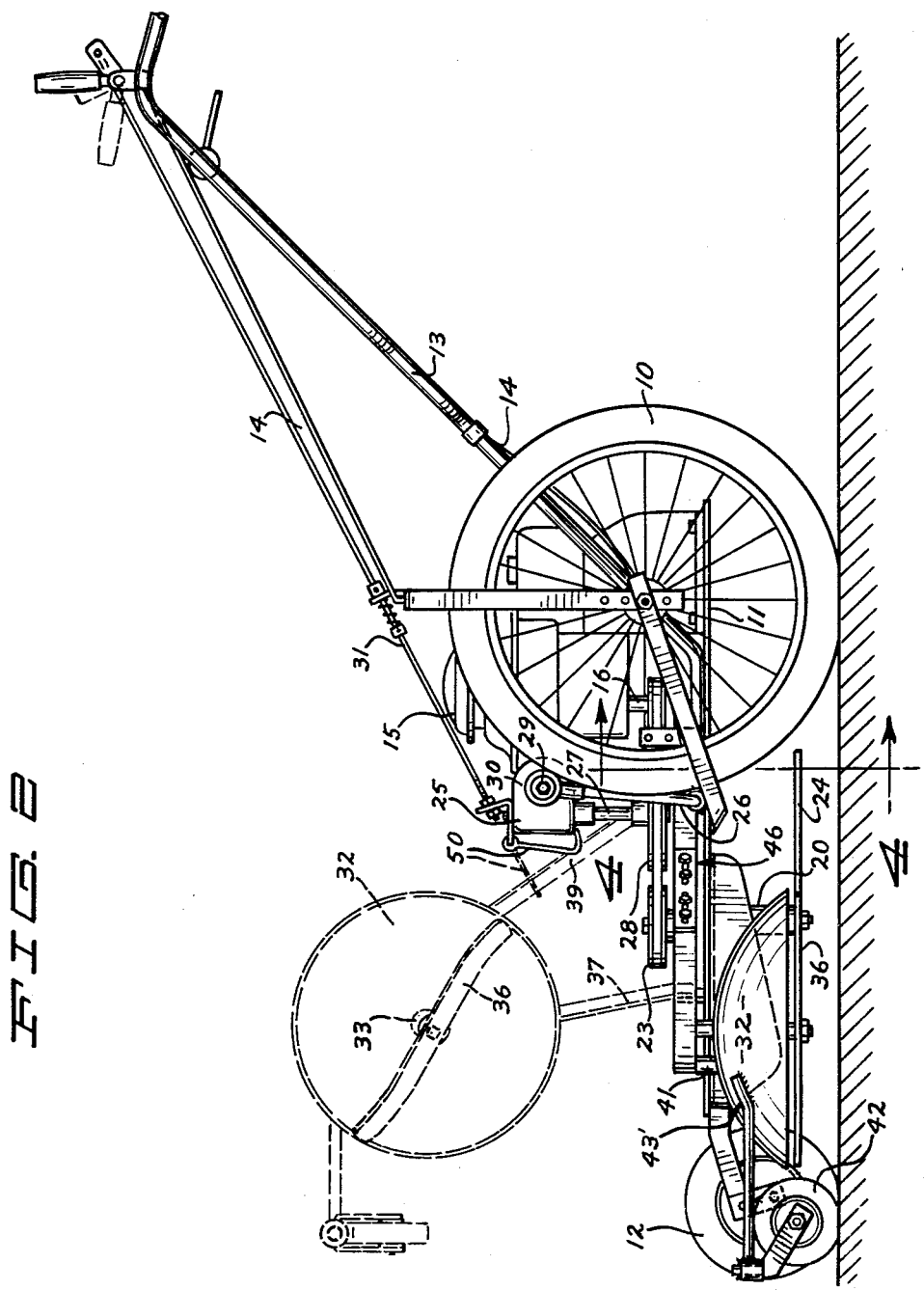

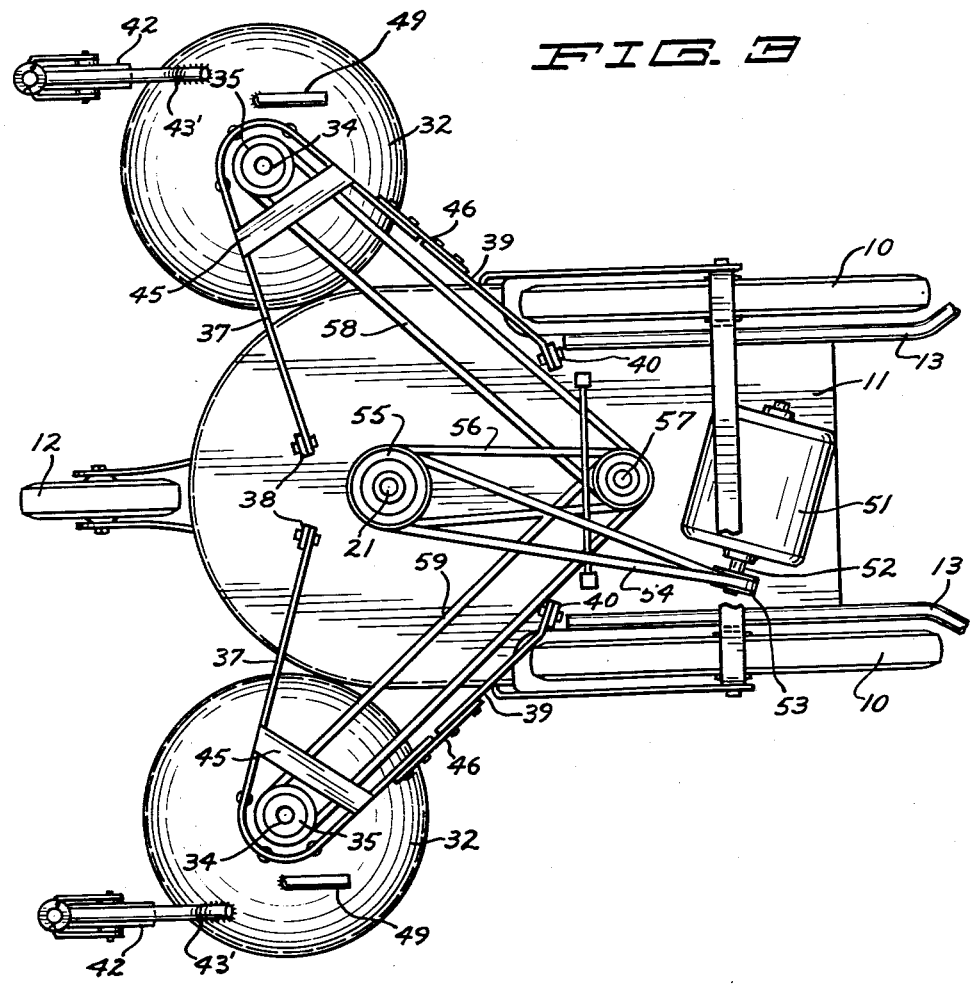
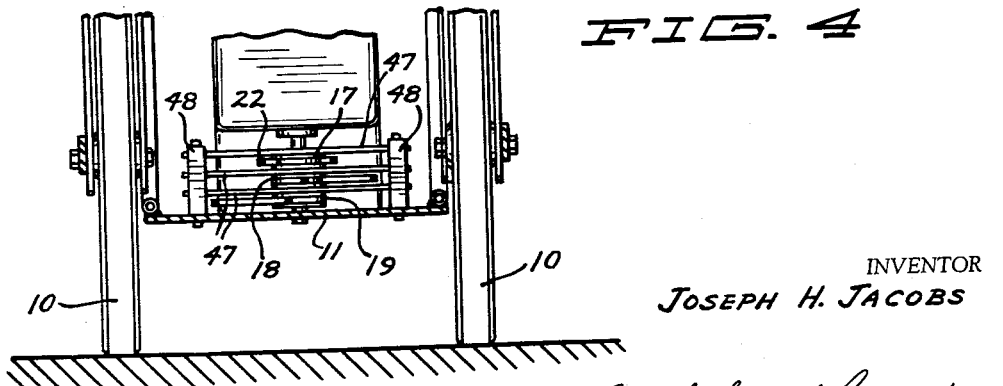

United States Patent Office 3,012,389
Patented Dec. 12, 1961

3,012,389
POWER MOWER
Joseph H. Jacobs, 1445 El Prado, Fort Myers, Fla.
Filed Mar. 4, 1959, Ser. No. 797,084
7 Claims. (Cl. 56—6)

The invention herein has relation to a power mower consisting of a main cutter unit of any conventional or preferred nature and a pair of outboard rotary cutter blade type cutter units pivotally mounted with respect to said main cutter unit at opposite sides thereof. As disclosed, the cutter blades of all of the cutter units are rotated by a prime mover mounted on the main cutter unit. In a preferred embodiment of the invention, the power mower is self-propelled. It could, however, be manually propelled.

Because of the frequent unevenness of areas to be mowed, the size of the swath which can efficiently and properly be cut by a single center main cutter unit is limited to something approximating 24 inches in the usual instance. A cutter any wider than this would tend to dig and scalp the sod at high-points of the lawn being cut and would tend to leave the grass unduly high at low points thereof. A device made according to the present invention, however, employs such a main cutter unit of approximately maximum efficient size, and has added thereto two outboard cutter units each supported by a wheel outwardly positioned from the main cutter unit to insure proper relationship of said outboard units with respect to the grass being mowed.

By pivoting either or both of the outboard cutter units on its mounting on the main cutter unit, said units can be rendered inoperative. This is important where the density of the grass being mowed would put a severe overload on the prime mover if the entire three cutter units were employed.

While the drawings disclose a particular embodiment of the invention, it is to be understood that numerous modifications are possible within the spirit of the invention and the scope of the claims which follow:

In the accompanying drawings forming a part of this specification,

FIG. 2 is a side elevational view of the disclosure of FIG. 1;

FIG. 3 is a top plan view of a power mower of slightly modified construction incorporating features and characteristics of the invention; and FIG. 4 is a vertical transverse sectional view, taken on line 4—4 in FIG. 2.

Figure 1:
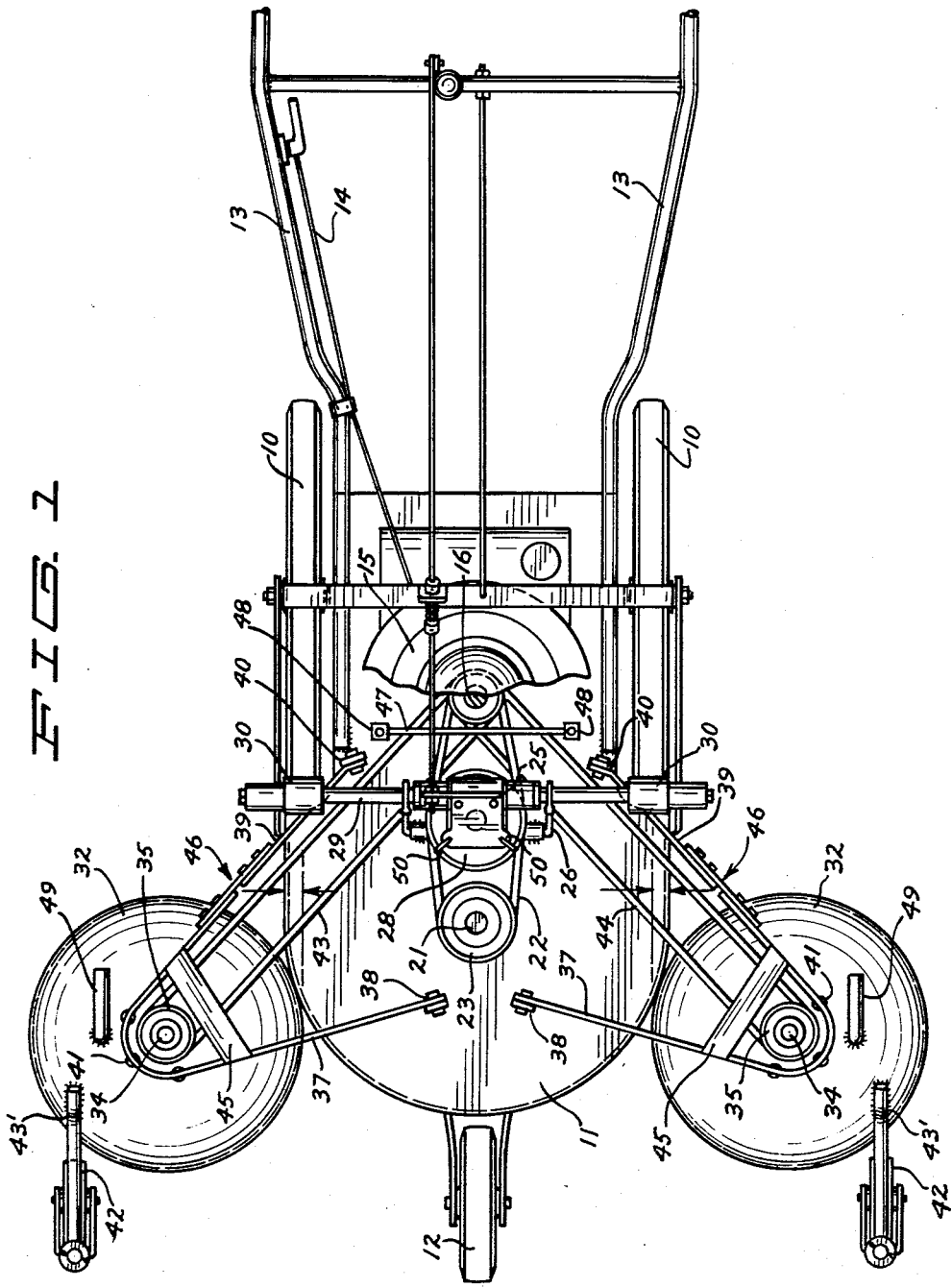
FIG. 1 is a top plan view, partially broken away, of a power mower made according to the invention.

With respect to FIGS. 1, 2 and 4 of the drawings, rear wheels 10 of the power mower suitably and conveniently support the rearward end portion of a horizontal platform 11, having a curvilinear forward portion, constituted as a part of a frame of a main cutter unit of said power mower, and a forward end portion of said horizontal platform is supported by a single front wheel 12 of the power mower disposed at the transverse center thereof. This construction is satisfactory for most installations, but it is to be understood that two wheels positioned laterally of the existing single wheel and in place of it would give better control over the level of the center cutting unit and also of outboard cutters pivotally supported thereon under certain conditions of ground terrain. Manipulating handles for the power mower are denoted 13, and controls for said power mower are represented at 14.

A vertical prime mover 15, supported on the frame of the power mower, above and between the rear wheels 10 is constituted as an internal combustion engine in the disclosure as made. The prime mover could, however, be an electric motor, a diesel engine, or of any character which might be preferred in some instance or other.

A driven shaft 16 of the internal combustion engine extends vertically downward therefrom at the transverse center of the main cutter unit of the power mower and rigidly supports vertically alined upper, intermediate and lower pulleys, indicated 17, 18 and 19, respectively.

The frame of the main cutter unit of the power mower rotatably supports, as at 20, a propeller shaft 21 situated at the transverse center and forwardly of the horizontal platform 11, and a first continuous belt 22 rides the upper pulley 17 on the driven shaft 16 and also rides a pulley 23 fixed on the upper end of the propeller shaft 21 at a location above the elevation of said horizontal platform. A central portion of a horizontal cutter blade 24 of the main cutter unit is fixed on the lower end of said propeller shaft 21 at a location below the elevation of the horizontal platform.

It is to be understood that any one of a very large number of conventional mowers now on the market could be readily converted to form the improved mower of the present invention. The description preceding and the description which follows is of such a modified and converted structure. However, for the sake of clarity and brevity of specification, no differentiation is made between the conventional and additional structures. Obviously this power mower of the invention could also be designed and built as a completely new unit.

A gear box 25, supported on the frame of the main cutter unit at 26, is situated forwardly of upper portions of the rear wheels 10 of the power mower, at the transverse center of the horizontal platform 11, and a driven shaft 27 extending downwardly from said gear box is rigid with a pulley 28 situated in the plane of and between the upper pulley 17 on the driven shaft 16 and the pulley 23 on the propeller shaft 21. The belt 22 on the pulleys 17 and 23 rides oppositely disposed surfaces of the pulley 28. The driven shaft 27 is for rotating a horizontal shaft 29 mounted in the gear box 25, through the instrumentality of gearing (not disclosed) in said gear box. Opposite end portions of the horizontal shaft 29 extend beyond the opposite sides of the gear box, and traction elements 30 on the opposite ends, respectively, of said horizontal drive shaft are held in engagement with the peripheries of the rear wheels 10 by a resiliently tensioned elongated element 31. Forcible rotation of the pulley 28 will be accomplished in response to longitudinal movement of the belt 22, and forcible rotation of the horizontal shaft 29 and the traction elements 30 thereon, through the instrumentality of the driven shaft 27 and the gearing, will cause the rear wheels 10 to rotate in direction to correspond, either forwardly or rearwardly as the case may be.

Each traction element 30 is detachably supported on the corresponding end portion of the horizontal shaft 29 and includes a relative large and a comparatively smaller cylindrical portion. As disclosed, the relatively large cylindrical portions are engaged with the peripheries of the rear wheels. The traction elements are reversible to engage the comparatively smaller cylindrical portions thereof with the peripheries of said rear wheels. The arrangement as disclosed will cause the power mower to be moved forward at faster rate than will the reverse arrangement and hence is preferable for cutting lighter growth. The reverse arrangement will cause the power mower to move forward at slower rate which may be more appropriate for the cutting of heavier growth. Stated differently, the rate of speed of advancement of the power mower can be altered, increased or decreased, merely by reversing the positions of the traction elements 30.

Outboard cutter units of the power motor, one at the right and the other at the left of the main cutter unit, are substantially of duplicate construction.

A normally horizontal dome-shape cover housing 32 of each outboard cutter unit is of convex configuration at its upper end of concave configuration at its lower side. Stated differently, the cover housings 32 are horizontally disposed when in operative position and each includes a depending annular skirt. Said cover housings serve as guards and protectors for cutter blades of the outboard cutter units and have means thereon whereby said outboard cutter units can be manually uplifted. Each cover housing 32 rotatably supports, as at 33, a propeller shaft 34 which is vertical when the cover housing is horizontal. An upper end of the propeller shaft 34 of each outboard cutter unit fixedly supports a pulley 35 at an elevation above the corresponding cover housing, and a lower end of each of said propeller shafts 34 fixedly supports a horizontal cutter blade 36 of the corresponding outboard cutter unit at a location below the corresponding cover housing.

The cover housing 32 of each outboard cutter unit is mounted on the horizontal platform 11 of the main cutter unit, for upward and downward swinging movement in a vertical plane, through the instrumentality of a V-shape support a shorter forward arm 37 of which is pivotally mounted, as at 38, on a forward portion of said horizontal platform at a location in advance of the propeller shaft 21 and a longer rearward arm 39 of which is pivotally mounted, as at 40, on a rearward portion of the horizontal platform at a location disposed slightly to the rear of said propeller shaft. The pivotal supports 38, 38 and 40, 40 respectively, are in transverse alinement and equally spaced from the longitudinal center of the horizontal platform at opposite sides thereof. Said pivotal supports 40, 40 are at farther distance from said longitudinal center than are said pivotal supports 38, 38. Each of the V-shape supports is above and extends forwardly and outwardly of the horizontal platform 11, and the cover housings 32 and cutter blades 36 are situated somewhat forwardly of the cutter blade 24 of the main cutter unit. An exterior end portion, or apex, of each V-shape support is in spaced, surrounding relation to the propeller shaft 34 and pulley 35 of the corresponding outboard cutter unit, as well as in the plane of said pulley 35, and said exterior end portion, or apex, is rigidly secured, as at 41, to a central portion of the concave upper surface of said corresponding outboard cutter unit cover housing.

A forward end portion of the cover housing 32 of each outboard cutter unit is supported on the ground by a caster wheel 42, disposed in a vertical plane and mounted on a forward outer portion of the cover housing through the medium of an arm 43. Desirably, the caster wheel 42 will be vertically adjustable for height of cut.

A second continuous belt 43 rides the intermediate pulley 18 on the driven shaft 16 of the internal combustion engine 15 and also rides the pulley 35 on the upper end of the propeller shaft 34 of the right outboard cutter unit, and a third continuous belt 44 rides the lower pulley 19 on said driven shaft 16 and also rides the pulley 35 on the upper end of the propeller shaft 34 of the left outboard cutter unit.

A strap 45 of or on each V-shape support, in overlying relation to the corresponding continuous belt, 43 or 44, interconnects exterior end portions of the upper edges of the arms 37, 39 of the V-shape support, and the arm 39 of each V-shape support is longitudinally adjustable, at 46, to the end that tension of the continuous belts can be increased or decreased, as may be appropriate.

The continuous belts 22, 43, 44 are retained in proper and desired relation to one another and to the upper, intermediate and lower pulleys 17, 18, 19, respectively, on the driven shaft 16 of the prime mover through the medium of a plurality of parallel, vertically spaced, transversely extending rods, each denoted 47. The rods 47 are situated forwardly of the pulleys 17, 18, 19 in adjacent relation thereto, and the opposite ends of said rods are supported on vertical posts 48.

Each of the outboard cutter units of the power mower is swingable between a position where on the ground at a side of the main cutter unit, ready for use, as in FIG. 1 of the drawings, and a position where supported on the platform of said main cutter unit within the confines thereof, as in dotted lines in FIG. 2. A handle 49 on the concave upper surface of each cover member is for convenience in swinging it upwardly from the position as in said FIG. 1, and hooks 50 are for detachably fastening the outboard cutter units in upwardly swung position.

The main cutter unit and both of the outboard cutter units can be simultaneously operative. The prime mover will forcibly rotate the driven shaft 16 and the upper, intermediate and lower pulleys 17, 18, 19 rigid therewith. The cutter blade 24 of the main cutter unit will be rotated through the instrumentality of the first continuous belt 22, the cutter blade 36 of the right outboard cutter unit will be rotated through the instrumentality of the second continuous belt 43, and the cutter blade 36 of the left outboard cutter unit will be rotated through the instrumentality of the third continuous belt 44. Each outboard cutter unit will be smoothly movable upwardly and downwardly relative to its pivotal supports 38, 40 with riding of its caster wheel 42 over uneven terrain. The construction and arrangement will be such that the tension of the continuous belts 43, 44 will vary but inappreciably while the outboard cutter units are in operation. The pivotal supports 38, 40 are as disclosed at locations to insure that necessary upward and downward riding movement over the ground will not inadvantageously alter belt tension.

The construction and arrangement also will be such that tension on each of the continuous belts 43, 44 will be loosened when the corresponding outboard cutter unit is elevated to the vertical or inoperative position where supported solely on the platform of the main cutter unit to extent insuring that there will be no force whatsoever applied to the pulley 35 of said corresponding outboard cutter unit tending to cause it, together with the propeller shaft 34 and the cutter blade 36, to be rotated. Stated differently, the cutter blade 36 of each outboard cutter unit will remain stationary as long as the outboard cutter unit is in elevated position.

The cutter blades 36 of the outboard cutter units, set somewhat forwardly of the cutter blade 24 of the main cutter unit, also will be set so that the orbits thereof will be in slightly overlapping relation to the path of travel of the tips of said cutter blade 24 if there is to be no growth left uncut between the blade tips. The orbit of the cutter blades 36 being somewhat forwardly disposed with regard to the orbit of the blade 24 cooperate with the latter to cut a continuous swath.

It will be apparent that the internal combustion engine 15 can be more easily started up when the outboard cutter units are supported in elevated position than otherwise. Desirably, the power mower can be transported while its outboard cutter units are up, on and within space directly above the platform of the main cutter unit. In some instances, as when heavier growth is to be cut, it may be appropriate to operate the power mower while one or both of the outboard cutter units are inoperative. Said outboard cutter units can be raised and lowered while the prime mover is operative.

Not only is the power mower equipped to be capable of cutting a wide strip or swath, each outboard cutter unit can be employable to readily cut or trim around low shrubbery, overhanging growths, etc. while encountering less interference than would a power mower constituted as a single entity of the general character of the main cutter unit herein illustrated and described.

The power mower is rendered efficiently maneuverable by reason of the fact the outboard cutter unit blades 36 are disposed forwardly of the main cutter unit blade 24. The curvilinear platform of said main cutter unit and the depending annular skirts of the cover housings of said outboard cutter units, as well as the orbits of the cutter blades on the main and outboard cutter units, respectively, are substantially tangentially disposed when said outboard cutter units are horizontal thus to define a forwardly facing, rearwardly converging V-shape mouth between said main cutter unit and each outboard cutter unit of configuration rendering it possible for the outboard cutter blades to sever growth in closely adjacent relation to upstanding objects, such as trees, shrubbery, etc. Also, it should be remarked, the tangential relation of the main cutter unit and the outboard cutter units, with the cutter blades 36 in advance of the cutter blade 24, is provision for cutting a continuous swath without overlapping of the orbits of the outboard cutter unit blades with the orbit of the main cutter unit blade.

Although many other combinations are possible in the disclosure as made, the outboard cutter units are assembled with a standard 21″ cut, 3½ horsepower, vertical motor, self-propelled power mower, constituting the main cutter unit hereinbefore described, and the cutter blade 36 of each of said outboard cutter units is 14 inches long. The overlying relation of the cutter blade 24 to the cutter blades 36, respectively, is one inch, more or less, and the width of the cut is approximately 47 inches. The new and improved power mower has been successfully employed to cut nearly two acres of average growth, grass and weeds, per hour.

In FIG. 3 there is disclosed a power mower of slightly modified construction. Parts shown in said FIG. 3 which are the same as, or equivalent to, parts appearing in FIGS. 1, 2 and 4 have been given the same reference numerals.

A horizontal prime mover 51 is suitably and conveniently supported upon the frame of the main cutter unit of the power mower. A driven shaft 52 of the prime mover 51 fixedly supports a pulley 53. A belt 54 rides the pulley 53 and also rides an upper pulley 55 on the propeller shaft 21. A belt 56 rides a lower pulley on said propeller shaft 21 and also rides an upper one of three pulleys rigid with a vertical shaft 57 rotatably mounted on the frame. A belt 58 rides an intermediate one of said three pulleys and also rides the pulley 35 of the right outboard cutter unit. A belt 59 rides a lower one of the three pulleys and also rides the pulley 35 of the left outboard cutter unit. It will be evident that the cutter blades of all of the cutter units will be rotated in response to rotation of the driven shaft 52 of the prime mover 51.

In both of the disclosed embodiments of the invention, the prime mover is set to the rear of the main cutter unit and the drive belts extend forwardly and outwardly to the pulleys of the outboard cutter units in a well defined V. Such a construction and arrangement is provision for free upward and downward swinging movement of said outboard cutter units without liability of belt misalinement as would be the case were the propeller shafts supporting the cutter blades 36, 24, 36 in transverse alinement. In FIG. 1 of the drawings the cutter blade 24 of the main cutter unit is rotated by the belt 22 riding the pulley 17 on the vertical driven shaft 16 of the prime mover, and the cutter blades 36 of the right and left outboard cutter units are rotated by belts riding the pulleys 18 and 19 on said vertical driven shaft 16. In FIG. 3 the cutter blade of the main cutter unit is rotated by the belt 54 riding the pulley 53 on the shaft of the prime mover, and the cutter blades of the right and left outboard cutter units are rotated by belts riding pulleys, equivalent to the pulleys 18 and 19, on the vertical shaft 57.

What I claim is:

1. A power mower having in combination a frame mounted for travel over the ground, said frame including a main, generally horizontal cutter housing having a substantially arcuate front peripheral portion, a rotary cutter mechanism mounted within said housing and having a blade describing in operation an orbit extending close to said arcuate front peripheral portion, the arcuate front peripheral portion of said housing comprising the front portion of said frame, an outboard cutter unit mounted for travel over the ground and comprising a housing having a generally annular peripheral portion and being normally disposed forwardly and to one side of said main frame cutter housing in substantially tangential relation therewith, a rotary cutter mechanism mounted within said outboard cutter housing and having a blade describing in operation an orbit extending close to said annular peripheral portion, the orbit of the blade of said outboard cutter unit overlapping the orbit of the blade of said main cutter housing in the direction of the travel of the power mower so that said blades will cut a continuous swath, and means pivotally connecting said outboard cutter housing with said main cutter housing to permit the former to follow the contour of the ground and also to permit the outboard cutter unit to be raised to an inoperative position disposed above the general confines of said frame.

2. The combination as set forth in preceding claim 1, a prime mover supported on said frame and power driving connections between said prime mover and said main and outboard cutting units for driving both of said units when said outboard unit is disposed in said tangential relation to said main unit and to drive only said main unit when said outboard unit is shifted to raised position.

3. The combination as set forth in claim 1 wherein said pivot means for said outboard cutter unit is positioned to maintain said outboard cutter unit in operation with said mounting means extended in such tangential relation with said main cutter unit and defining between the peripheral portions of said main and outboard cutting units, a forward V-shaped mouth converging rearwardly to facilitate close cutting of grass around upstanding objects such as the trunks of trees and shrubs.

4. A rotary power mower having in combination a frame mounted for travel over the ground, said frame having a forward, generally horizontal main cutter housing provided with a generally annular front peripheral portion, main rotary cutter mechanism mounted within said housing for rotation about a vertical axis, an outboard rotary cutter unit mounted at one side and somewhat forwardly of said main cutter housing when in operative position, said outboard cutter unit including a cutter mechanism mounted for rotation about a substantially vertical axis, the orbits of rotation of said cutter mechanisms overlapping in the direction of travel of the power mower so that said cutter units cut a continuous swath, a swingably shiftable mounting arm having its inner portion pivotally connected to said frame and having a terminal portion connected to said shiftable outboard cutter unit and dimensioned and hinged to dispose said outboard cutter unit in generally tangential but slightly forwardly advanced position relative to said housing of said main cutter unit, said arm being upwardly and inwardly swingable above said frame to shift said outboard cutting unit in an upstanding position above the general confines of said frame when not in operation, and powered means connected with said frame for driving only said main cutter unit when said outboard unit is shifted to upstanding, inoperative position and to drive both of said cutter units when said mounting arm is swung to extended position, disposing said outboard cutter unit substantially tangential to said main cutting unit.

5. The combination as defined in preceding claim 4 wherein said outboard cutter unit is provided with a ground-engaging means to independently support and determine the height of said outboard unit in accordance with contour of the terrain over which said outboard unit travels in operative position.

6. A multi-cutter rotary power mower having in combination a generally horizontal frame mounted for travel over the ground and having at its forward portion an open bottomed cutter housing, a main cutter mechanism mounted in said housing for revolution on a substantially vertical axis and having a cutter blade which describes in operation a substantially horizontal annular orbit, a pair of individually shiftable outboard cutter units mounted when in operation at the respective right and left sides of said main cutter mechanism and each having a revolving cutter blade describing an orbit generally tangential to one side of the orbit described by said main cutter blades, the orbits of rotation of said outboard cutter blades overlapping the orbit of rotation of the main cutter blade in the direction of travel of the mower so that said blades will cover a continuous swath, a shiftable mounting medium for each of said outboard cutter units and having an outer portion connected with its cutter unit and another portion connected to and supported from said frame, said mounting medium being extensible to maintain its connected outboard cutting unit in the substantial tangential relation previously defined and being retractable upwardly and inwardly to position its connective cutter unit in an upstanding relation above and substantially within the confines of said frame and means for retaining each of said mounting mediums in said retracted upstanding position.

7. The structure set forth in claim 6 wherein said mounting media comprises for each of said outboard cutter units a substantially rigid arm having an inner end pivotally connected to said frame, the axes of pivoting of said two mounting arms converging forwardly longitudinally of said frame and said arms when extended outwardly being disposed obliquely of the longitudinal center of said frame and dimensioned between said hinge axis and said connection with the respective outboard cutting units to dispose said outboard cutting units symmetrically of said main cutting unit in the aforesaid substantially tangential relationship but with said outboard cutting units disposed somewhat forwardly of said main cutting unit.

References Cited in the file of this patent
UNITED STATES PATENTS

| | | |
|---|---|---|
| 2,682,740 | Miller et al. | July 6, 1954 |
| 2,690,040 | Miller et al. | Sept. 28, 1954 |
| 2,782,585 | Hervey | Feb. 26, 1957 |
| 2,786,320 | Larson | Mar. 26, 1957 |
| 2,801,510 | Colburn | Aug. 6, 1957 |
| 2,898,723 | Goodall | Aug. 11, 1959 |